US008224256B2

(12) United States Patent
Citrano, III et al.

(10) Patent No.: US 8,224,256 B2
(45) Date of Patent: Jul. 17, 2012

(54) WIRELESS FIELD MAINTENANCE ADAPTER

(75) Inventors: Joseph Citrano, III, Eden Prairie, MN (US); Todd M. Toepke, Eden Prairie, MN (US); Alan R. Dewey, Plymouth, MN (US); Alden C. Russell, III, Minnetonka, MN (US); Stephen Armstrong, Savage, MN (US); Craig T. Llewellyn, Bloomington, MN (US); David J. Baker, Carver, MN (US); Stuart A. Harris, Minnetonka, MN (US)

(73) Assignee: Fisher-Rosemont Systems, Inc., Austin, TX (US)

( * ) Notice: Subject to any disclaimer, the term of this patent is extended or adjusted under 35 U.S.C. 154(b) by 204 days.

(21) Appl. No.: 12/691,353

(22) Filed: Jan. 21, 2010

(65) Prior Publication Data
US 2010/0190442 A1     Jul. 29, 2010

Related U.S. Application Data

(60) Provisional application No. 61/148,130, filed on Jan. 29, 2009, provisional application No. 61/178,748, filed on May 15, 2009.

(51) Int. Cl.
*H04B 17/00* (2006.01)
(52) U.S. Cl. ............... 455/67.11; 455/67.14; 455/115.1; 715/23
(58) Field of Classification Search ............. 455/67.11, 455/67.14, 115.1, 115.2, 226.1, 41.2, 423; 714/23, 35; 700/7, 17
See application file for complete search history.

(56) References Cited

U.S. PATENT DOCUMENTS

| 5,442,639 | A | 8/1995 | Crowder et al. ............. 371/20.1 |
| 6,211,649 | B1 | 4/2001 | Matsuda ....................... 320/115 |
| 6,236,223 | B1 * | 5/2001 | Brady et al. ................. 324/750.3 |
| 6,377,859 | B1 | 4/2002 | Brown et al. ..................... 700/79 |
| 6,629,059 | B2 | 9/2003 | Borgeson et al. ............. 702/183 |
| 6,971,063 | B1 * | 11/2005 | Rappaport et al. ............. 715/733 |
| 7,117,122 | B2 | 10/2006 | Zielinski et al. ............... 702/183 |
| 7,400,255 | B2 * | 7/2008 | Horch ......................... 340/572.7 |
| 7,421,531 | B2 | 9/2008 | Rotvold et al. ............... 710/315 |
| 7,506,812 | B2 * | 3/2009 | von Mueller et al. ......... 235/449 |
| 7,733,833 | B2 * | 6/2010 | Kalika et al. .................. 370/338 |

(Continued)

FOREIGN PATENT DOCUMENTS
GB     2 394 124     4/2004
(Continued)

OTHER PUBLICATIONS

EPO Communication pursuant to Rules 161(1) and 162 EPC for corresponding European patent application No. 10701430.0 dated Aug. 30, 2011.

(Continued)

*Primary Examiner* — Minh D Dao
(74) *Attorney, Agent, or Firm* — Christopher R. Christenson; Westman, Champlin & Kelly, P.A.

(57) ABSTRACT

A wireless field maintenance adapter includes a power source, a controller, a low-power radio-frequency communication module, and a wireless process communication protocol module. The controller is coupled to the power source. The low-power radio-frequency communication module is also coupled to the controller. The wireless process communication protocol module is coupled to the controller. The controller is configured to communicate through the wireless process communication protocol module based on information received from the low-power radio-frequency communication module.

20 Claims, 5 Drawing Sheets

U.S. PATENT DOCUMENTS

| | | | |
|---|---|---|---|
| 8,126,145 B1 | 2/2012 | Tewari et al. | 380/255 |
| 2002/0027504 A1 | 3/2002 | Davis et al. | 340/540 |
| 2002/0086642 A1 | 7/2002 | Ou et al. | 455/69 |
| 2002/0171558 A1 | 11/2002 | Bartelheim et al. | 340/825.49 |
| 2003/0109937 A1 | 6/2003 | Zielinski et al. | 700/1 |
| 2004/0111238 A1 | 6/2004 | Kantzes et al. | 702/183 |
| 2004/0204193 A1 | 10/2004 | Li et al. | 455/575.1 |
| 2004/0228184 A1 | 11/2004 | Mathiowetz | 365/202 |
| 2004/0230327 A1 | 11/2004 | Opheim et al. | 700/83 |
| 2005/0164684 A1 | 7/2005 | Chen et al. | 455/414.1 |
| 2006/0014533 A1 | 1/2006 | Warren | 455/423 |
| 2006/0206277 A1* | 9/2006 | Horch | 702/82 |
| 2006/0290496 A1* | 12/2006 | Peeters | 340/572.1 |
| 2006/0291438 A1 | 12/2006 | Karschnia et al. | 370/338 |
| 2007/0161352 A1 | 7/2007 | Dobrowski et al. | 455/69 |
| 2007/0161371 A1 | 7/2007 | Dobrowski et al. | 455/423 |
| 2007/0208279 A1* | 9/2007 | Panella et al. | 600/595 |
| 2008/0114911 A1 | 5/2008 | Schumacher | 710/72 |
| 2009/0065578 A1 | 3/2009 | Peterson et al. | 235/382 |
| 2009/0125713 A1 | 5/2009 | Karschnia et al. | 713/153 |
| 2009/0296601 A1 | 12/2009 | Citrano et al. | 370/254 |
| 2010/0100766 A1* | 4/2010 | Bengtsson et al. | 714/23 |
| 2010/0145476 A1* | 6/2010 | Junk et al. | 700/7 |
| 2010/0220630 A1* | 9/2010 | Kalika et al. | 370/254 |

FOREIGN PATENT DOCUMENTS

| | | |
|---|---|---|
| WO | WO 01/35190 | 5/2001 |
| WO | WO 02/086662 | 10/2002 |
| WO | WO 2008/042074 | 4/2008 |
| WO | WO 2008/127632 | 10/2008 |
| WO | WO 2009/003146 | 12/2008 |
| WO | WO 2009/003148 | 12/2008 |

OTHER PUBLICATIONS

Notification of Transmittal of the International Search Report and the Written Opinion from the International Application No. PCT/US2010/034889.

Notification of Transmittal of the International Search Report and the Written Opinion from the International Application No. PCT/US2010/034949.

Invitation to Pay Additional Fees for international patent application No. PCT/US2010/034889 dated Sep. 15, 2010.

ABB Limited: "Wireless Instrumentation Jargon Buster". Information bulletin instrumentation ABB No. IB/INST-018, Mar. 3, 2009, XP002596601. Retrieved from the Internet: URL:http://www05.abb.com/global/scot/scot203.nsf/veritydisplay/be00ec76ef07e978c125756e003157b9/$File/IB_INST_018_1.pdf.

David Gustafsson: "WirelessHART—Implementation and Evaluation on Wireless Sensors". Masters's Degree Project, KTH University, Electrical Engineering, Apr. 1, 2009, pp. I-39, XP002596602, Stockholm, Sweden. Retrieved from the Internet: URL:http://www.ee.kth.se/php/modules/publications/reports/2009/XR-EE-RT%202009:003.pdf.

Notification of Transmittal of the International Search Report and the Written Opinion for the International application No. PCT/US2010/034848 dated Aug. 26, 2010.

Invitation to Pay Additional Fees for international patent application No. PCT/US2010/034949 dated Sep. 17, 2010.

1420 Wireless Gateway. Product Data Sheet 00813-0100-4420, Rev BA Mar. 2008. Emerson Process Management.

Smart Wireless Gateway (WirelessHART™). Quick Installation Guide 00825-0200-4420, Rev BA, Aug. 2009. Emerson Process Management.

1420 Wireless Gateway. Reference Manual 00809-0100-4420, Rev BA. Aug. 2007. Emerson Process Management.

Rosemount 3051S Wireless Series Scalable Pressure, Flow, and Level Solutions. Reference Manual 00809-0100-4802, rev BA. Aug. 2007. Emerson Process Management.

Notification of Transmittal of the International Search Report and the Written Opinion from the International Application No. PCT/US2010/021764.

EPO Communication from related European application No. 10730279.6 dated Jan. 13, 2012.

EPO Communication from related European application No. 10730281.2 dated Jan. 13, 2012.

EPO Communication from related European application No. 10725543.2 dated Jan. 12, 2012.

* cited by examiner

WIRELESS FIELD MAINTENANCE ADAPTER

CROSS-REFERENCE TO RELATED APPLICATION

The present application is based on and claims the benefit of U.S. provisional patent application Ser. No. 61/148,130, filed Jan. 29, 2009 and U.S. provisional patent application Ser. No. 61/178,748, filed May 15, 2009, the contents of which are hereby incorporated by reference in their entireties.

BACKGROUND

Handheld field maintenance tools are known. Such tools are highly useful in the process control and measurement industry to allow operators to conveniently communicate with and/or interrogate field devices in a given process installation. Examples of such process installations include petroleum, pharmaceutical, chemical, pulp, and other fluid processing installations. In such installations, the process control and measurement network may include tens or even hundreds of various field devices which periodically require maintenance to ensure that such devices are functioning properly and/or calibrated. Moreover, when one or more errors in the process control and measurement installation are detected, the use of a handheld field maintenance tool allows a technician to quickly diagnose such errors in the field.

Since at least some process installations may involve highly volatile, or even explosive, environments, it is often beneficial, or even required, for field devices and the handheld field maintenance tools used with such field devices to comply with intrinsic safety requirements. These requirements help ensure that compliant electrical devices will not generate a source of ignition even under fault conditions. One example of Intrinsic Safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research October, 1998. An example of a handheld field maintenance tool that complies with intrinsic safety requirements includes that sold under trade designation Model 475 Field Communicator, available from Fisher-Rosemount Systems, Inc. of Eden Prairie, Minn.

Given the unique environmental considerations for field devices, communication signaling has traditionally been carefully controlled. Examples of industrial process communication protocols include the Highway Addressable Remote Transducer (HART®) Protocol, and the FOUNDATION™ Fieldbus Protocol. Both of these protocols are considered wired protocols in that a physical wire connection is made to each field device.

Recently, some field devices have been designed to communicate wirelessly. These field devices, accordingly, do not require any communication or power wiring thereby simplifying field wiring, as well as interaction with the device. However, handheld field maintenance tools with terminals that are designed to physically couple to wiring terminals of a field device are simply not able to communicate with these new wireless field devices.

SUMMARY

A wireless field maintenance adapter includes a power source, a controller, a low-power radio-frequency communication module, and a wireless process communication protocol module. The controller is coupled to the power source. The low-power radio-frequency communication module is also coupled to the controller. The wireless process communication protocol module is coupled to the controller. The controller is configured to communicate through the wireless process communication protocol module based on information received from the low-power radio-frequency communication module.

DETAILED DESCRIPTION OF ILLUSTRATIVE EMBODIMENTS

Figure 1A:
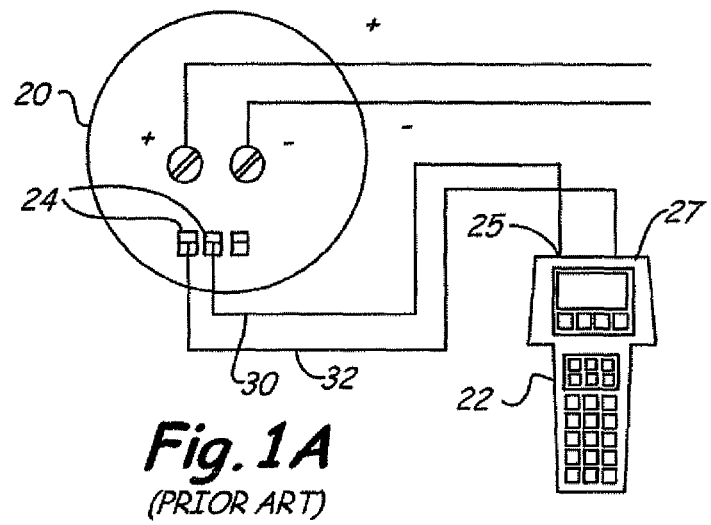
FIGS. 1A and 1B are diagrammatic views of a handheld field maintenance tool coupled to a field device in accordance with the prior art.
Figure 1B:
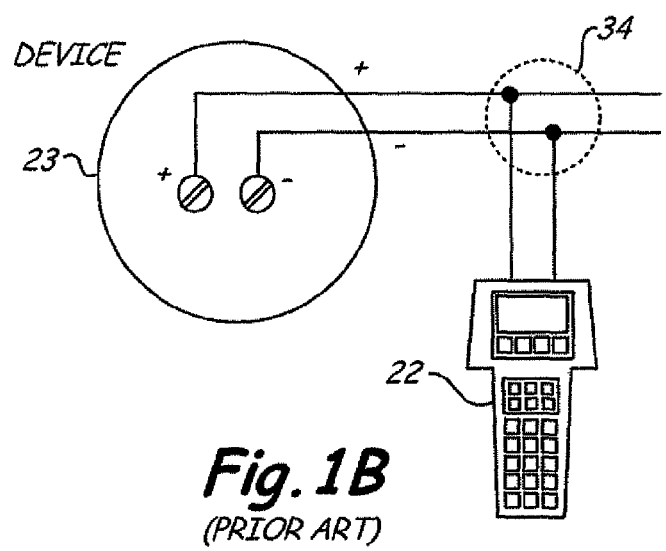

FIGS. 1A and 1B are diagrammatic views of a handheld field maintenance tool 22 coupled to field devices in accordance with the prior art. As shown in FIG. 1A, handheld field maintenance tool 22 includes a pair of terminals 25, 27 that couple to test leads 30, 32, respectively, which are then coupled to terminals 24 of field device 20. Terminals 24 may be dedicated terminals to allow such a handheld field maintenance tool to couple to device 20 and interact with device 20.

FIG. 1B shows an alternate arrangement where handheld field maintenance tool 22 couples directly to the process control loop 34 to which field device 23 is coupled. In either case, the wired connection between the handheld field maintenance tool and the field device allows the handheld field maintenance tool to interact with the desired field device 20, 23.

Figure 2:
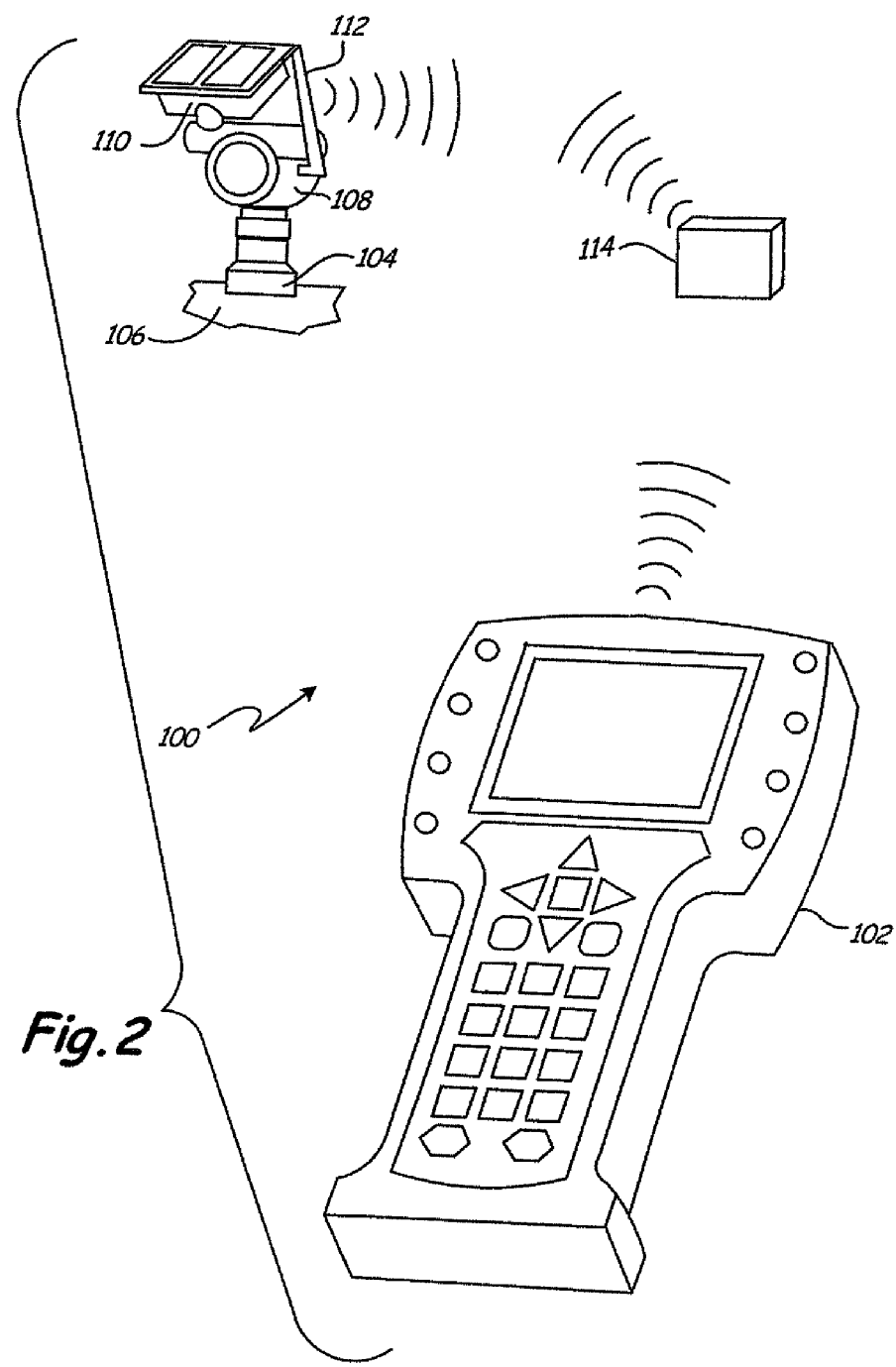
FIG. 2 is a diagrammatic view of a handheld field maintenance tool interacting with a wireless field device in accordance with an embodiment of the present invention.

FIG. 2 is a diagrammatic view of a handheld field maintenance tool interacting with a wireless field device in accordance with an embodiment of the present invention. System 100 includes handheld field maintenance tool 102 communicating wirelessly with wireless field device 104 via wireless field maintenance adapter 114. Wireless field device 104 is depicted as an industrial process fluid pressure transmitter having a pressure manifold 106 coupled thereto, and an electronics enclosure 108. The electronics enclosure 108 is further coupled to a source of energy (in this example shown as solar cell 110) and includes a wireless communication module communicating wirelessly through antenna 112. Wireless field device 104 is provided for illustrative purposes only. In reality, wireless field device 104 may be any industrial device, such as a process fluid temperature transmitter, process fluid level transmitter, process fluid flow transmitter, valve controller, or any other device that is useful in the measurement and/or control of industrial processes.

Wireless field device 104 communicates in accordance with a wireless process communication protocol. One example of such a protocol is the new WirelessHART standard. This standard uses wireless communication, at the 2.4 GHz frequency, but otherwise employs the same command structure as that used in Wired HART® communication. More specific information regarding the wireless HART® protocol may be found at the Wireless HART® Specification published by the HART Communication Foundation. Relevant portions of the Wireless HART® Specification include: HCF_Spec 13, revision 7.0; HART Specification 65—Wireless Physical Layer Specification; HART Specification 75—TDMA Data Link Layer Specification (TDMA refers to Time Division Multiple Access); HART Specification 85—Network Management Specification; HART Specification 155—Wireless Command Specification; and HART Specification 290—Wireless Devices Specification. While the Wireless HART® protocol is one example of a wireless process communication protocol, other standards can be employed in accordance with embodiments of the present invention.

In accordance with an embodiment of the present invention, handheld field maintenance tool 102 includes a relatively short range radio frequency module, such as that in accordance with known Bluetooth specification, such as Bluetooth Specification 2.1 rated at Power Class 2. However, since the command syntax and signaling between Bluetooth and wireless HART® is inconsistent, the ability of handheld field maintenance tool 102 to communicate in accordance with the Bluetooth specification does not allow wireless interaction with wireless field device 104. Accordingly, embodiments of the present invention generally employ adapter 114 to bi-directionally communicate with handheld field maintenance tool 102, and bi-directionally communicate with wireless field device 104. As will be described in greater detail below, adapter 114 includes adaptations via hardware, software, or both for communication in accordance with the relatively low-power radio frequency communication of handheld field maintenance tool 102, as well as communication in accordance with at least one wireless process communication protocol such as the wireless HART® protocol. Those skilled in the art will recognize that since adapter 114 communicates wirelessly with both the handheld field maintenance tool 102 and the wireless field device 104, that a physical connection is not required to either device. Accordingly, it is contemplated that adapter 114 may be simply a module that is carried by a technician during field maintenance. Additionally, while providing a handheld field maintenance tool with direct wireless HART® communication ability would obviate the need for adapter 114, it would not provide the ability to communicate with wireless HART® field devices to legacy handheld field maintenance tools that are currently used by technicians, which only have the ability to communicate in accordance with the Bluetooth protocol. Further still, since the Bluetooth specification provides relatively standardized communication, it is contemplated that multiple adapters 114 could be used to communicate in accordance with a variety of different wireless process communication protocols that exist now or may later be developed via a single handheld field maintenance tool. Thus, to some extent, the provision of a wireless process communication adapter allows handheld field maintenance tool 102 to be used as essentially a universal wireless configurator when used in conjunction with appropriate adapters 114. Examples of other suitable wireless process communication protocols that can be used in accordance with embodiments of the present invention include that maintained by the Instrument Society of Automation as ISA-SP100.11a protocol, or any other suitable wireless process communication protocols. Finally, it is also contemplated that, in addition to the Bluetooth specification, adapter 114 can include any suitable additional or alternate radio frequency communication protocols, such as the known Wi-Fi protocols in accordance with IEEE 802.11 family of WLAN protocols and/or known RFID signaling protocols.

Figure 3:
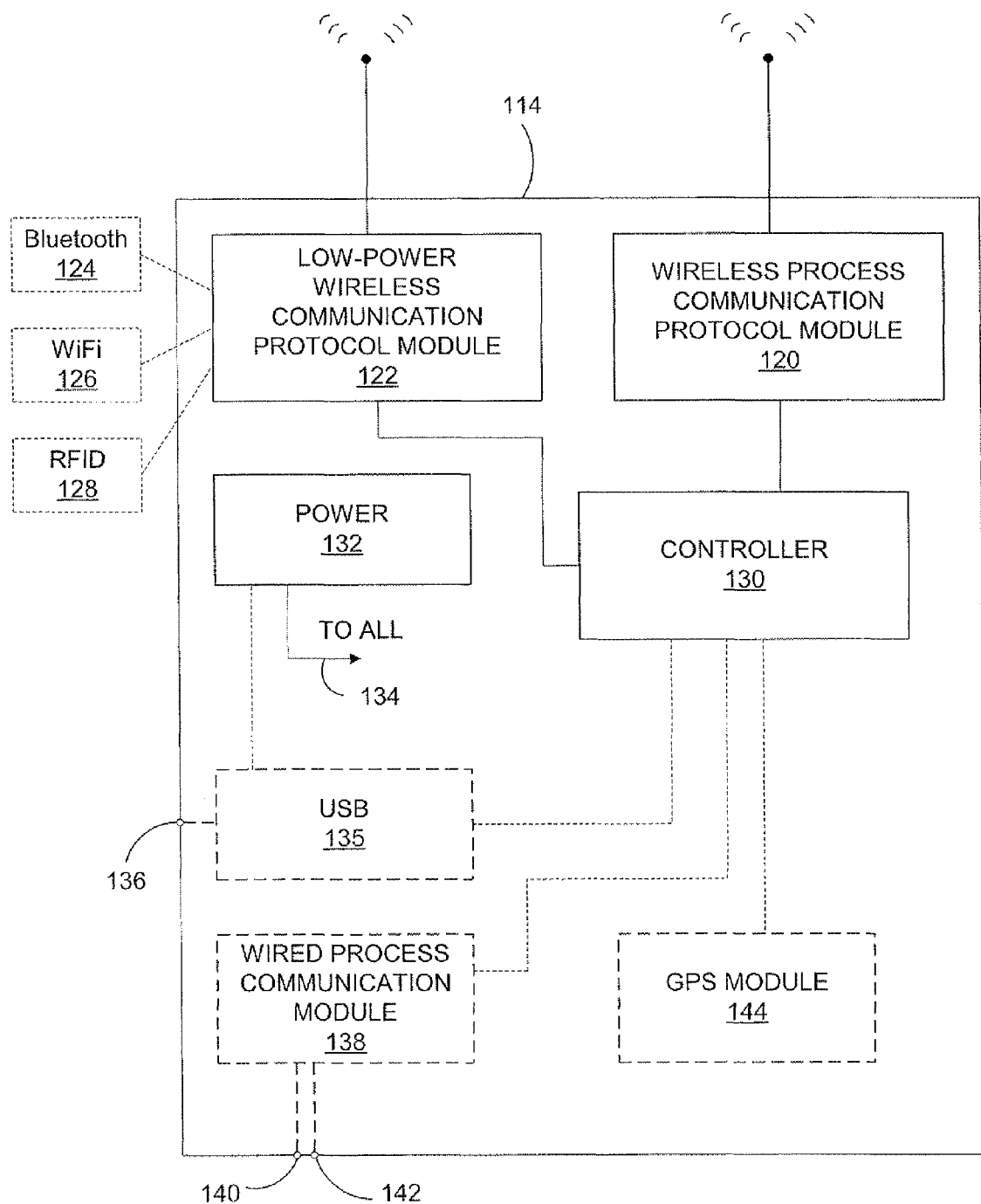
FIG. 3 is a diagrammatic view of a wireless field maintenance adapter in accordance with an embodiment of the present invention.

FIG. 3 is a diagrammatic view of a wireless field maintenance adapter in accordance with an embodiment of the present invention. Adapter 114 is preferably self-powered using a rechargeable battery. Additionally, it is preferred that the physical characteristics of adapter 114 be such that the device may be placed in the pocket or on a belt clip. Further still, it is preferred that adapter 114 comply with an intrinsic safety specification, such as that listed above, in order to help ensure safety in potentially explosive environments.

Wireless process communication adapter 114 includes at least one wireless process communication module 120. Suitable examples for wireless process communication module 120 include a module that generates and/or receives proper signals in accordance with a known wireless communication protocol, such as the wireless HART® protocol described above. Another suitable wireless process communication standard is set forth in ISA 100.11a. This technology proposes wireless communication at the 2.4 GHz frequency using radio circuitry in accordance with the IEEE 802.15.4-2006. While embodiments of the present invention will be described with respect to adapter 114 including a single wireless process communication module, it is expressly contemplated that embodiments of the present invention can be practiced with wireless adapters that include a plurality of wireless process communication modules that enable communication in accordance with a plurality of distinct wireless process communication protocols.

Adapter 114 also includes at least one relatively low-power radio frequency communication protocol module 122. Additionally, it is expressly contemplated that multiple distinct low-power radio frequency modules 122 could be used. Each such module communicates in accordance with a known low-power radio frequency communication protocol. Suitable examples of such protocols include the known Bluetooth specification 124, communication in accordance with IEEE 802.11 126 and/or communication signaling protocols used in known radio frequency identification (RFID) techniques 128. Each of modules 120 and 122 is coupled to controller 130 which is preferably a microprocessor. Through suitable adaptations via hardware, software, or both, controller 130 is configured to communicate bi-directionally using both modules 120 and 122. In this manner, signals received via module 122 can be processed and information based on such signals can be transmitted via module 120. Conversely, signals received via wireless process communication module 120 can be processed and information based thereon can be transmitted via wireless communication protocol module 122. Further, in embodiments of the present invention where multiple low-power radio frequency indication protocol modules 122 are employed, it is expressly contemplated that controller 130 may be configured to translate or otherwise adapt signals received from one communication adapter 122 in a first protocol to communication through a second module 122 in accordance with a second protocol. For example, in embodiments where adapter 114 includes a wireless process communication protocol module for communicating in accordance with Bluetooth and a module for communicating in accordance with Wi-Fi, controller 130 may be adapted to translate, or otherwise bridge, communication between the Bluetooth and Wi-Fi devices.

Adapter 114 includes power module 132 connected to all other components of adapter 114 as indicated by arrow 134 labeled "to all." Power module 132 is preferably a rechargeable battery, but may be any suitable power source that is able to store, generate, or condition suitable electrical power to operate adapter 114.

Embodiments of the present invention may also include any or all of the features illustrated in phantom in FIG. 3. In particular, embodiments of the present invention may include an adapter 114 that employs a Universal Serial Bus (USB) module 135 to facilitate communication in accordance with the Universal Serial Bus communication standard between controller 130 and an external device coupled to USB port 136. Additionally, USB module 134 is also coupled to power module 132 such that power module 132 may be recharged or otherwise receive energy from USB module 134 when a suitable device is coupled to USB port 136. Additionally, adapter 114 may include one or more wired process communication protocol modules 138 that couple to wired terminals 140, 142 in order to allow controller 130 to communicate in accordance with one or more process wired communication protocols. Suitable examples of such modules can be found in a commonly-assigned, co-pending U.S. patent application Ser. No. 11/974,917, filed on Oct. 16, 2007. Further, embodiments of the present invention may include adapter 114 having a GPS receiver module 144 coupled to controller 130. GPS receiver module 144 can be in accordance with any known GPS technology and can provide location information of adapter 114 in accordance with known techniques. Further, since the GPS satellites provide a very precise time reference, GPS module 144 can be used to set, or otherwise synchronize, the time base of module 114. Finally, GPS module 144 may be adapted to operate in accordance with known differential GPS techniques wherein a network of fixed, ground-based reference stations are used to broadcast the difference between the positions indicated by the satellite systems and the known fixed positions.

Controller 130 is preferably configured to facilitate firmware/software upgrades via selected connections, such as Bluetooth 124 or USB 134. In addition, it is believed that upgrading such firmware/software will allow adapter 114 to more easily support other and subsequently-developed process communication networks such as SP100 or Foundation Fieldbus as standards become available.

While embodiments of the present invention are described with respect to facilitating communication between a Bluetooth-enabled handheld communicator and a wireless field device, those skilled in the art will appreciate that embodiments of the present invention can be practiced wherein a communication from any device in accordance with wireless communication protocols 124, 126, 128 is translated, or otherwise adapted, for communication in accordance with a wireless process communication protocol. Thus, computers such as a laptop PC or any suitable Bluetooth-enabled host device can be provided with wireless communication to a wireless field device.

Providing a wireless process communication adapter in accordance with embodiments of the present invention facilitates a number of field maintenance tasks. Such tasks include configuration, calibration, testing, and troubleshooting of wireless field devices.

Field devices, in general, can be complex, having many variables which must be configured for the desired measurement and application. A common responsibility of maintenance personnel is to verify field device parameters, to make the necessary changes to the field device with a suitable configuration tool, and to document the device configuration and calibration data "as found" before the verification, and "as left" after completing the verification. This data may include information about the measurement, the condition of the field device, and the device configuration. This "as found/as left" data may then be stored in a portable handheld field maintenance tool, or transferred by one means or another to a device database or asset management software package for later reference.

Historically, getting data from a field device has meant physically connecting the device to a suitable field maintenance tool, or, in the most severe case, uninstalling the field device from the process to verify the required details on a workbench. Making a physical connection to the field device terminals to access the desired data may be difficult depending on the location and mounting of the field device, or simply impossible due to the inability to open the device in the plant for safety reasons. In accordance with an embodiment of the present invention, the wireless field maintenance adapter enables the transfer of signals from the wireless field device to a handheld field maintenance tool which is preferably intrinsically safe. Further, signals can be transferred from the handheld field maintenance tool to the wireless field device or a wireless network in order to determine and/or record "as found/as left" data for the wireless field device. The signals translated by the wireless process communication adapter may be requests from the handheld field maintenance tool to the wireless field device, or the data from the wireless field device.

In accordance with one embodiment, adapter 114 may be physically coupled by virtue of wired process communication module 138 and terminals 140, 142 to wired terminals of a handheld field maintenance tool. Accordingly, in such embodiment, adapter 114 receives signals from the handheld field maintenance tool via terminals 140, 142 and generates wireless HART® communications to a wireless field device in order to determine and/or record the "as found/as left" data for the wireless field device. Accordingly, in this embodiment, adapter 114 is translating or otherwise adapting wireless HART® signals from a wireless HART® capable field device or network into HART® signals that can be processed by a handheld field maintenance tool.

In another embodiment where the handheld field maintenance tool may have the ability to communicate in accordance with a relatively low-power radio frequency communication protocol, such as Bluetooth, adapter 114 need not physically couple to either the handheld field maintenance tool or the wireless field device. In this embodiment, adapter 114 translates Bluetooth signals from the handheld field maintenance tool into wireless process communication signals, such as wireless HART®, which are then transmitted to a wireless-capable field device or process communication network. Adapter 114 also translates wireless process communication signals from the wireless-capable field device or network into Bluetooth signals that can be processed and/or stored by the handheld field maintenance tool. Preferably, both the handheld field maintenance tool and adapter 114 are constructed to comply with an intrinsic safety specification, such as that set forth above.

Figure 4:
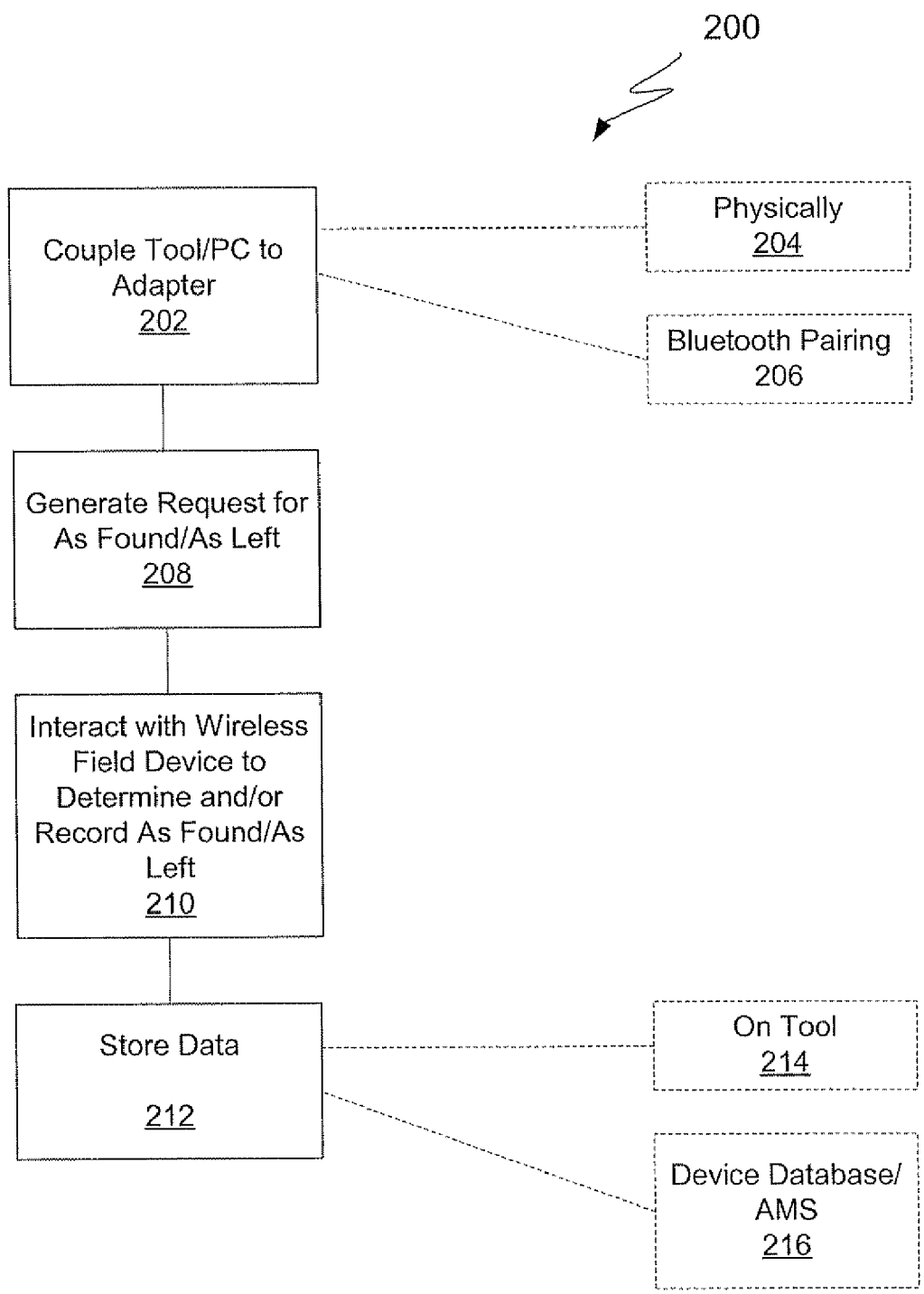
FIG. 4 is a flow diagram of a method of determining and/or recording "as found/as left" data relative to a wireless field device in accordance with an embodiment of the present invention.

FIG. 4 is a flow diagram of a method of determining and/or recording "as found/as left" data relative to a wireless field device in accordance with an embodiment of the present invention. Method 200 begins at block 202 where a wireless field maintenance adapter is coupled to a handheld field maintenance tool. The coupling effected in block 202 can be done either physically 204 or via Bluetooth pairing 206. Each of these techniques is described above. Method 200 continues at block 208 where a technician interacts with a handheld field maintenance device to generate a request for as found/as left data. Next, at block 210, the handheld field maintenance device interacts with the wireless field maintenance adapter to communicate with a wireless field device in order to determine and/or record the as found/as left data. Additionally, any suitable additional information relative to the measurement, condition of the wireless field device, device configuration, or any other suitable information may be stored. Additional information can include a time and/or date stamp, as well as an indication of the location, as indicated by a GPS sensor, of the wireless field device. Method 200 continues at block 212 where the as found/as left data is stored. As indicated in FIG. 4, storage of this data can either be on a handheld field maintenance tool as indicated at block 214, or via a device database or asset management software package as indicated at block 216.

Another common maintenance task that is significantly facilitated by a wireless field maintenance adapter in accordance with an embodiment of the present invention is proof testing for loops and process communication segments. A common responsibility for maintenance personnel is to "proof test" a control loop or segment to verify that field devices installed thereon are correctly wired, that the wiring is complete and accurate, that power is available, and that alarms are properly installed and configured as required. This proof test is often performed using a handheld field maintenance tool, such as a handheld communicator or laptop PC loaded with required software that can force the required response from various field devices to test other field devices such as meters, recorders, or alarms in the process communication loop.

Historically, conducting a proof test with a portable field maintenance tool required accessing the field device or process communication loop with a physical connection from the control room or while in the plant or field. Conducting such a test in the field allows a technician to verify the desired response (e.g., meter indication or audio alarm) from other devices in the loop. However, making a physical connection may be difficult or time-consuming depending upon the location of access points in the loop.

In accordance with an embodiment of the present invention, signals may be transferred from a handheld field maintenance tool, which is preferably intrinsically safe, to a field device or to a gateway in the process communication loop in order to "proof test" a control loop or segment to verify, for example, the devices are correctly installed, wiring is complete and accurate, power is available, and alarms are properly installed and configured as required.

In one embodiment, adapter 114 is physically coupled to wired terminals of a handheld field maintenance tool. For example, terminals 140, 142 can be physically coupled to terminals of a handheld field maintenance tool. Adapter 114 then essentially translates wired HART® signals from the handheld field maintenance tool using wired process communication module 138 into signals that can be transmitted to a wireless field device via wireless process communication protocol module 120. Adapter 114 can also translate or otherwise adapt wireless process communication signals from a wireless-capable field device or gateway into process wired signals that can be processed by the handheld field maintenance tool. Preferably, both the handheld field maintenance tool and adapter 114 are constructed in accordance with at least one intrinsic safety specification.

In another embodiment, adapter 114 may be spaced from the handheld field maintenance tool. In this embodiment, adapter 114 receives low-power radio-frequency signals, such as Bluetooth signals from the handheld field maintenance tool and using suitable configuration and/or software instructions, controller 130 can translate such signals into suitable wireless process communication signals. For example, Bluetooth signals may be translated into wireless HART® signals. These wireless process communication signals can be transmitted to a wireless-capable field device or gateway. Adapter 114 is also configured to translate wireless process communication signals into Bluetooth signals that can be processed by the handheld field maintenance tool.

In another embodiment, adapter 114 may be physically connected to or remote from the Bluetooth-capable computer running required software to perform loop testing and/or segment testing. In this embodiment, adapter 114 translates Bluetooth signals from the computer into wireless process communication signals, such as wireless HART® signals, which are then transmitted to a wireless-capable field device or gateway. Adapter 114 also operates in the reverse in that wireless process communication signals from a wireless-capable field device or gateway are translated by adapter 114 into Bluetooth signals that can be processed by the computer.

In yet another embodiment, adapter 114 can be physically connected to a USB port on a computer. The computer then executes suitable software to perform loop and/or segment testing on wireless field devices. In this embodiment, adapter 114 translates communications received via USB module 134 into suitable wireless process communication signals for transmission through wireless process communication module 120. Adapter 114 also operates in the reverse in that wireless process communication signals received from module 120 can be passed to the computer via module 134. Additionally, in embodiments where adapter 114 includes a GPS module 144, the loop testing and/or segment testing can be augmented with additional data relative to the location of adapter 114.

Figure 5:
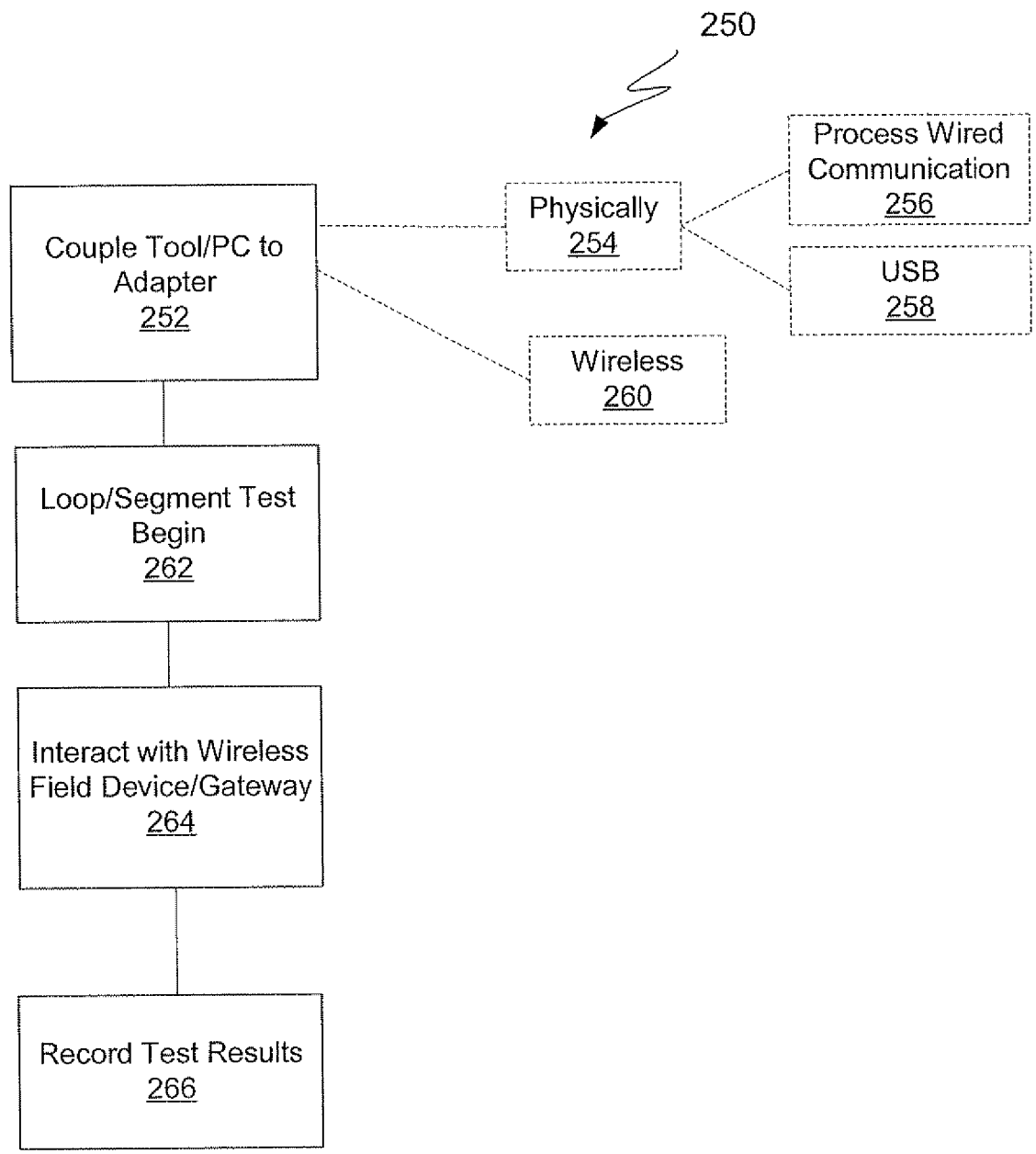
FIG. 5 is a flow diagram of a method of performing loop and/or segment testing of a wireless process communication loop and/or devices in accordance with an embodiment of the present invention.

FIG. 5 is a flow diagram of a method of performing loop and/or segment testing of a wireless process communication loop and/or devices in accordance with an embodiment of the present invention. Method 250 begins at block 252 where a handheld field maintenance tool or suitable computing device is coupled to a wireless process communication adapter. This coupling can be done physically (254) such as using a process wired connection (256) or using a USB connection (258). Additionally or alternatively, the coupling can be wireless 260. Method 250 continues at block 262 where the loop/segment test is initiated. Subsequently, block 264 executes where the handheld field maintenance tool or personal computer interacts through the wireless process communication adapter with a wireless process communication loop and/or one or more wireless field devices. Once the interaction of block 264 is complete, the test results are recorded at block 266. The test results can be recorded in the handheld field maintenance tool and/or stored in the wireless field maintenance adapter for subsequent transfer into a suitable database, asset management system, or other suitable software application.

Although the present invention has been described with reference to preferred embodiments, workers skilled in the art will recognize that changes may be made in form and detail without departing from the spirit and scope of the invention.

What is claimed is:

1. A wireless field maintenance adapter comprising:
a power source;
a controller coupled to the power source;

a low-power radio-frequency communication module coupled to the controller;
a wireless process communication protocol module coupled to the controller; and
wherein the controller is configured to communicate through the wireless process communication protocol module based on information received from the low-power radio-frequency communication module.

2. The wireless field maintenance adapter of claim 1, wherein the controller is further configured to communicate through the low-power radio-frequency communication module based on information received from the wireless process communication protocol module.

3. The wireless field maintenance adapter of claim 1, wherein the low-power radio-frequency communication module communicates in accordance with a Bluetooth specification.

4. The wireless field maintenance adapter of claim 1, wherein the wireless process communication protocol module communicates in accordance with a Wireless HART specification.

5. The wireless field maintenance adapter of claim 1, wherein the power source is a rechargeable battery.

6. The wireless field maintenance adapter of claim 1, and further comprising a USB communication module operably coupled to the power source and to the controller.

7. The wireless field maintenance adapter of claim 1, and further comprising a wired process communication protocol module operably disposed between a plurality of terminals and the controller.

8. The wireless field maintenance adapter of claim 7, wherein the wired process communication protocol module is a HART process communication protocol module.

9. The wireless field maintenance adapter of claim 1, and further comprising a GPS receiver coupled to the controller to provide an indication of geographical location of the adapter to the controller.

10. The wireless field maintenance adapter of claim 1, wherein the controller has firmware that is updateable.

11. The wireless field maintenance adapter of claim 1, and further comprising an additional low-power radio-frequency communication module coupled to the controller.

12. The wireless field maintenance adapter of claim 11, wherein the controller is further configured to translate signals between the plurality of low-power radio-frequency communication modules.

13. The wireless field maintenance adapter of claim 1, and further comprising an additional wireless process communication protocol module, and wherein the plurality of wireless process communication protocol modules are configured to communicate in accordance with different wireless process communication protocols.

14. A method of determining as found/as left information relative to a wireless field device, the method comprising:
coupling a handheld field maintenance tool to a wireless field maintenance adapter;
generating a request with the handheld field maintenance tool for as found/as left data;
constructing wireless process communication signals based on the request and transmitting such signals to the wireless field device through the wireless field maintenance adapter;
receiving as found/as left data from a wireless field device as wireless process communication information; and
storing the as found/as left data.

15. The method of claim 14, wherein coupling the handheld field maintenance tool to the wireless field maintenance adapter includes physically coupling the handheld field maintenance tool to the wireless field maintenance adapter.

16. The method of claim 14, wherein coupling the handheld field maintenance tool to the wireless field maintenance adapter includes pairing the two devices together in accordance with a wireless handshake process.

17. A method of conducting a proof test of a process communication loop or segment using a handheld field maintenance tool, the method comprising:
coupling the handheld field maintenance tool to a wireless field maintenance adapter;
initiating a proof test with the handheld field maintenance tool;
wirelessly interacting with at least one wireless process device with the wireless field maintenance adapter; and
recording proof test results.

18. The method of claim 17, wherein coupling the handheld field maintenance tool to the wireless field maintenance adapter includes physically coupling the handheld field maintenance tool to the wireless field maintenance adapter.

19. The method of claim 18, wherein the physical coupling is via a process wired communication module in wireless field maintenance adapter.

20. The method of claim 18, wherein the physical coupling is via a Universal Serial Bus connection.

* * * * *